United States Patent
Ishikawa et al.

(10) Patent No.: US 9,639,417 B2
(45) Date of Patent: May 2, 2017

(54) STORAGE CONTROL APPARATUS AND CONTROL METHOD

(71) Applicant: FUJITSU LIMITED, Kawasaki-shi, Kanagawa (JP)

(72) Inventors: Keiya Ishikawa, Kawasaki (JP); Nina Tsukamoto, Koto (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 14/645,461

(22) Filed: Mar. 12, 2015

(65) Prior Publication Data
US 2015/0278009 A1 Oct. 1, 2015

(30) Foreign Application Priority Data
Mar. 28, 2014 (JP) .................. 2014-067626

(51) Int. Cl.
*G06F 11/10* (2006.01)
(52) U.S. Cl.
CPC ...... *G06F 11/1004* (2013.01); *G06F 11/1044* (2013.01); *G06F 11/1076* (2013.01)
(58) Field of Classification Search
CPC .... G06F 11/104; G06F 11/10; G06F 11/1004; H03M 13/091; H04L 1/0061
USPC ........................................................ 714/807
See application file for complete search history.

(56) References Cited

U.S. PATENT DOCUMENTS

| | | | |
|---|---|---|---|
| 6,216,247 B1 | 4/2001 | Creta et al. | |
| 2003/0023933 A1* | 1/2003 | Duncan | G06F 11/1076 714/807 |
| 2005/0036371 A1 | 2/2005 | Kushida | |
| 2006/0080505 A1 | 4/2006 | Arai et al. | |
| 2007/0079217 A1 | 4/2007 | Haugan et al. | |
| 2007/0133331 A1 | 6/2007 | Park et al. | |
| 2007/0268905 A1* | 11/2007 | Baker | H04L 1/0052 370/392 |
| 2010/0131706 A1* | 5/2010 | Bean | G06F 11/008 711/114 |
| 2013/0326317 A1 | 12/2013 | Adler et al. | |

FOREIGN PATENT DOCUMENTS

| | | |
|---|---|---|
| JP | 2006-107311 A | 4/2006 |
| JP | 2007-115390 A | 5/2007 |
| WO | 2011/025474 A1 | 3/2011 |

OTHER PUBLICATIONS

Extended European Search Report dated Jul. 10, 2015 for corresponding European Patent Application No. 15158995.9, 5 pages.

* cited by examiner

*Primary Examiner* — Albert Decady
*Assistant Examiner* — Enam Ahmed
(74) *Attorney, Agent, or Firm* — Fujitsu Patent Center

(57) ABSTRACT

A storage control apparatus controls a storage device. The storage device includes a first storage area and a second storage area different from the first storage area. An error detection information storage unit generates an ECC for each of data blocks in data to be written, as error detection information. The error detection information storage unit stores generated ECC 1 to ECC 4 in the first storage area. A data storage unit stores data blocks DB1 to DB4 in the second storage area. A detection unit performs error detection on each of the data blocks according to the error detection information read from the first storage area and the data to be written read from the second storage area.

3 Claims, 14 Drawing Sheets

STORAGE CONTROL APPARATUS AND CONTROL METHOD

CROSS-REFERENCE TO RELATED APPLICATION

This application is based upon and claims the benefit of priority of the prior Japanese Patent Application No. 2014-067626, filed on Mar. 28, 2014, the entire contents of which are incorporated herein by reference.

FIELD

The embodiments discussed herein are related to a storage control apparatus and a control method.

BACKGROUND

As storage devices for use in information processing systems, disk array devices (also referred to as RAID (redundant arrays of inexpensive disks) device) are widely used to enhance high-speed data access performance and data failure tolerance. The disk array devices are frequently used in open systems that operate with different kinds of general-purpose operating systems and thus have a data format of fixed-length records.

When data is stored in a storage device, the data is given an error check code for determining whether the data has an error. In the fixed-length data format, for example, an error check code is given to each of logical blocks.

Japanese Laid-open Patent Publication No. 2006-107311
Japanese Laid-open Patent Publication No. 2007-115390

A storage control apparatus temporarily holds in a memory data corresponding to a write request from a host, and then stores the same in a storage device. At that time, some abnormality may occur in the data and may result in a failure in normal data writing into the storage device.

For example, depending on the form of data failure, the data may not be written on a logical block basis into the storage device, and thus the stored data may be held without being updated. At that time, the storage device holds the old data and the error check code for the same. If the storage device is subjected to staging in this state, the storage control apparatus will determine the old data to be proper because there is a match between the error check code read into a cache memory and the error check code calculated from the data read into the cache memory. Since the storage control apparatus does not detect the failure of data writing into the storage device, the storage control apparatus returns the old data to the host where data corruption occurs.

SUMMARY

In one aspect of the embodiments, there is provided a storage control apparatus including a processor that performs a procedure including: generating error detection information for each data block as a unit of access in data to be written; storing the error detection information in a first storage area of a storage device; storing the data to be written in a second storage area different from the first storage area of the storage device; and performing error detection on each data block according to the error detection information read from the first storage area and the data to be written read from the second storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
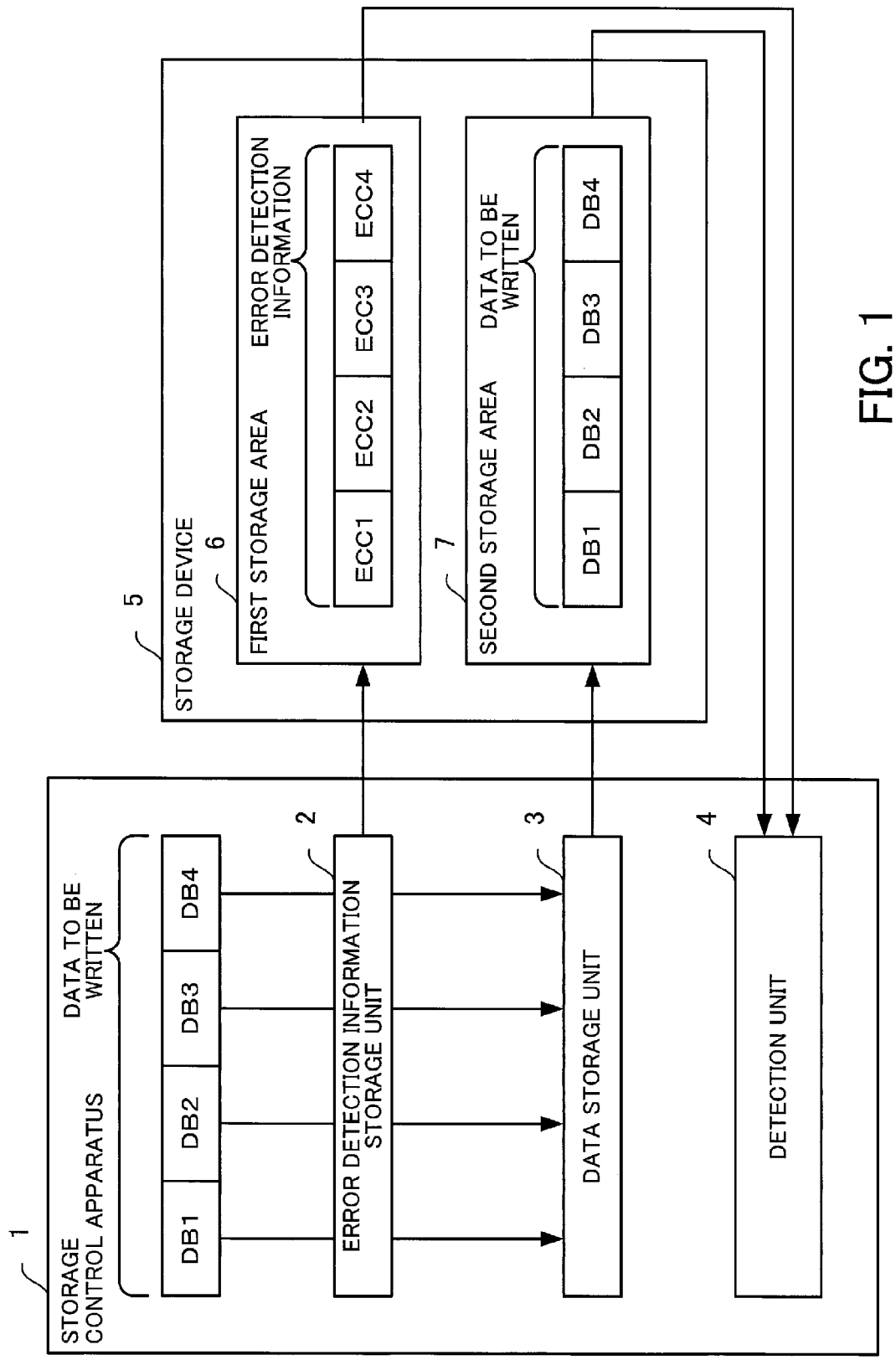
FIG. 1 illustrates an example of a configuration of a storage control apparatus in a first embodiment.

Several embodiments will be described below with reference to the accompanying drawings, wherein like reference numerals refer to like elements throughout.

First Embodiment

First, a storage control apparatus in a first embodiment will be described with reference to FIG. 1. FIG. 1 illustrates an example of a configuration of the storage control apparatus in the first embodiment.

A storage control apparatus 1 controls writing of data into a storage device 5 and reading of data from the storage device 5. The storage control apparatus 1 writes data into the storage device 5 upon receipt of a data writing instruction from an external device not illustrated, and reads data from the storage device 5 upon receipt of a data reading instruction from the external device.

The storage control apparatus 1 includes an error detection information storage unit 2, a data storage unit 3, and a detection unit 4. The storage device 5 is controlled by the storage control apparatus 1 and includes a first storage area 6 and a second storage area 7. The first storage area 6 and the second storage area 7 are different from each other. The storage device 5 may be an external storage device or an internal storage device relative to the storage control apparatus 1. The storage device 5 may be a disk drive such as an HDD (hard disk drive) or a SSD (solid state drive), or may be a cache memory that temporarily stores data.

The error detection information storage unit 2 generates an ECC (error check code) as error detection information for each of data blocks in the data to be written. A data block is a unit of access to the storage device 5. For example, when the storage device 5 is an HDD, a unit of access is an LBA (logical block address). The error detection information storage unit 2 divides the data to be written into data blocks. Although FIG. 1 illustrates four data blocks DB1, DB2, DB3, and DB4, the number of data blocks depends on the size of the data to be written and thus is not limited to four as illustrated in FIG. 1.

The error detection information storage unit 2 generates an ECC 1 from the data block DB1, an ECC 2 from the data block DB2, an ECC 3 from the data block DB3, and an ECC 4 from the data block DB4. The error detection information storage unit 2 stores the generated ECC 1 to ECC 4 in the first storage area 6.

The data storage unit 3 stores the data blocks DB1 to DB4 in the second storage area 7. The detection unit 4 performs error detection on each of the data blocks, based on the error detection information read from the first storage area 6 and the data to be written read from the second storage area 7. For example, the detection unit 4 reads the ECC 1 from the first storage area 6 and reads the data block DB1 from the second storage area 7. The detection unit 4 performs error detection on the data block DB1 by generating the ECC1 from the data block DB1 read from the second storage area 7 and then comparing the generated ECC 1 with the ECC 1 read from the first storage area 6.

Accordingly, the storage control apparatus 1 may detect that at least one of the error detection information stored in the first storage area 6 and the data to be written stored in the second storage area 7 is not correctly written into the corresponding storage area (data writing failure). Therefore, the storage control apparatus 1 is improved in the detection accuracy of data writing failure.

Second Embodiment

Figure 2:
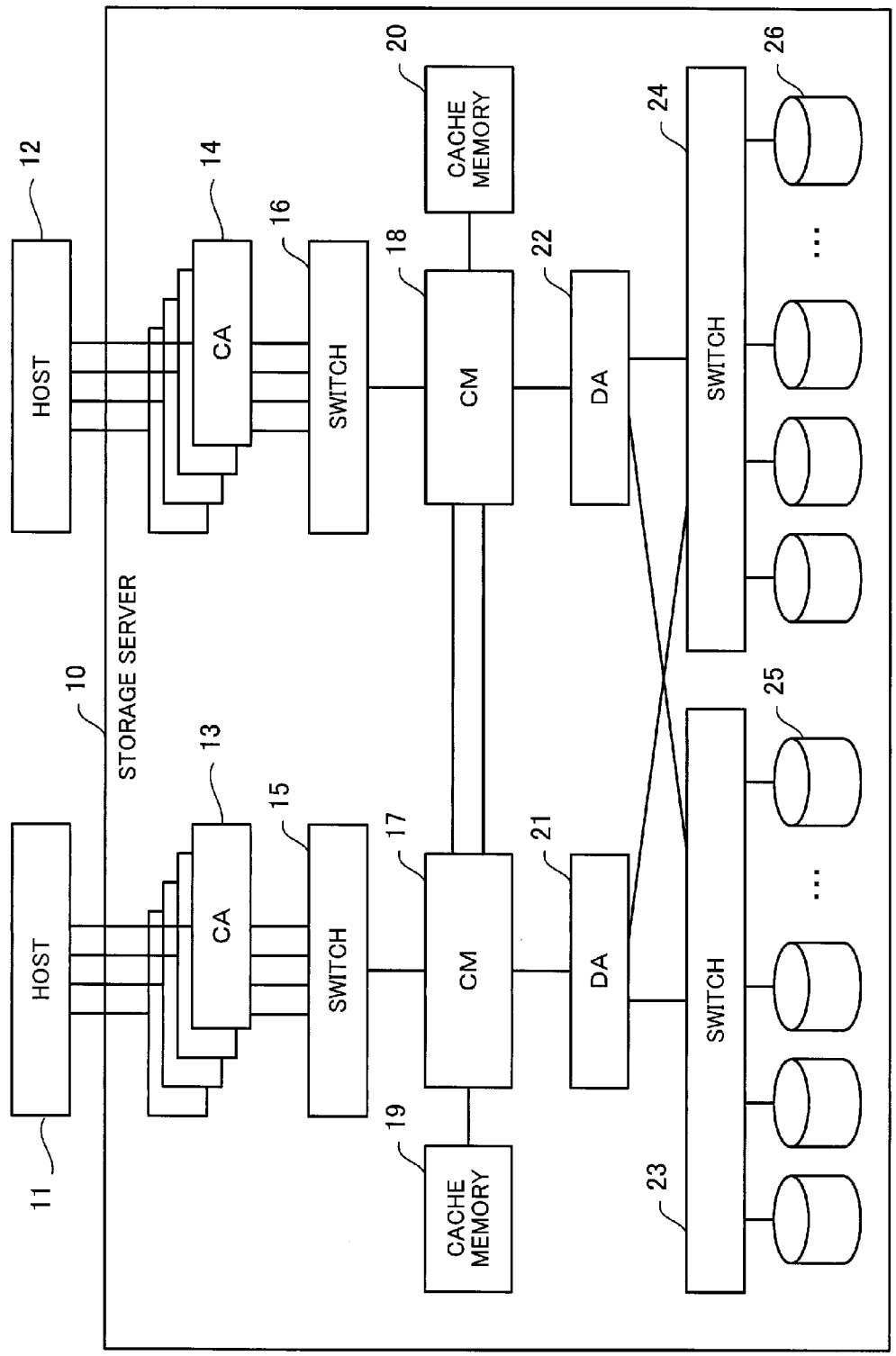
FIG. 2 illustrates an example of a configuration of a storage server in a second embodiment.

Next, a storage server in a second embodiment will be described with reference to FIG. 2. FIG. 2 illustrates an example of a configuration of the storage server in the second embodiment.

A storage server 10 includes a plurality of HDDs 25 and 26 to provide hosts (host computers) 11 and 12 with a high-speed, large-capacity, and high-reliability disk system. The storage server 10 writes data into the HDDs 25 and 26 upon receipt of write requests from the hosts 11 and 12, and reads data from the HDDs 25 and 26 upon receipt of read requests from the hosts 11 and 12. The HDDs 25 and 26 are one type of storage devices, and the storage server 10 is one type of a storage control apparatus controlling the storage devices.

The storage server 10 includes CAs (channel adapters) 13 and 14, switches 15, 16, 23, and 24, CMs (controller modules) 17 and 18, cache memories 19 and 20, DAs (device adapters) 21 and 22, and HDDs 25 and 26.

The CAs 13 and 14 are I/F (interface) control modules in the storage server 10. The CAs 13 and 14 serve as protocol chips to control various interfaces such as FC (Fibre Channel), iSCSI (Internet Small Computer System Interface), FCLINK, and OCLINK, and transfer data to an internal bus. The number of CAs 13 is two or more. The CAs 13 are configured to connect the host 11 and the switch 15 in a redundant configuration. The number of CAs 14 is two or more. The CAs 14 are configured to connect the host 12 and the switch 16 in a redundant configuration.

The CAs 13 and 14 take charge of handling commands from the hosts 11 and 12 and making access to the cache memories 19 and 20. The CAs 13 connects to the CM 17 via the switch 15. The CAs 14 connect to the CM 18 via the switch 16. The CAs 13 and 14 add BCCs (block check codes) for data protection to user data transferred from the hosts 11 and 12 according to a disk format. The BCC is an ECC for each of data blocks. The CAs 13 and 14 also check data read from the HDDs 25 and 26, remove the BCCs from the data, and transfer the data to the hosts 11 and 12.

The CMs 17 and 18 are control modules that entirely control the storage server 10 through exclusive data control, cache memory management, HDD read/write control, and others. The CM 17 contains the cache memory 19 and manages the cache memory 19. The CM 18 contains the cache memory 20 and manages the cache memory 20. The storage server 10 has a redundant configuration with the CM 17 and the CM 18, such that, in the event of a failure at one of the CMs, the other takes over the process. The user data is mirrored across two systems of the CM 17 and the CM 18, and the mirrored user data is shared by the CM 17 and the CM 18.

The DAs 21 and 22 are configured to connect the CMs 17 and 18 to the plurality of HDDs 25 and 26 via the switches 23 and 24 for controlling the HDDs 25 and 26. The HDDs 25 and 26 are one type of drive modules and may be replaced with SSDs or the like, for example. The HDDs 25 and 26 form a disk array module together with the DAs 21 and 22 and the switches 23 and 24, for example.

Figure 3:
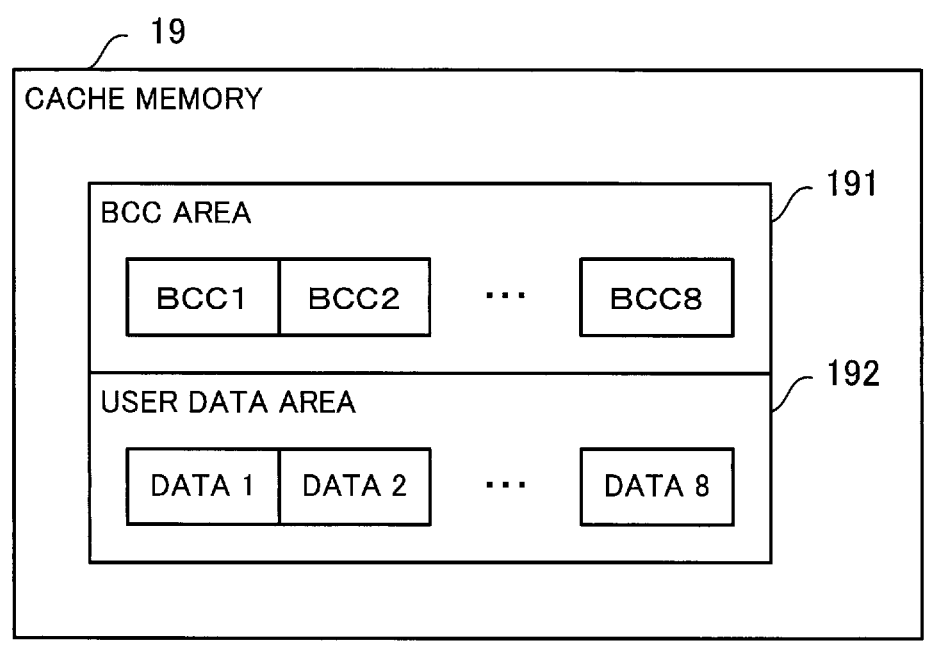
FIG. 3 illustrates an example of a configuration of a cache memory in the second embodiment.

Next, a cache memory in the second embodiment will be described with reference to FIG. 3. FIG. 3 illustrates an example of a configuration of the cache memory in the second embodiment. The cache memory 19 and the cache memory 20 are the same in configuration, and descriptions will be given only as to the cache memory 19.

The cache memory 19 includes a BCC area 191 and a user data area 192. The user data area 192 is a storage area for storing user data. The BCC area 191 is one of storage areas for storing metadata, which is different from the user data area 192.

The user data area 192 stores user data on a data block basis. A user block here is a unit of access to the HDDs 25 and 26, which is an LBA (logical block address), for example. The user data area 192 stores data 1, data 2, . . . , and data 8 on a data block basis, for example.

The BCC area 191 stores a BCC for each of the data blocks. The BCC is one piece of error detection information, which is composed of a 6-byte BID (block ID) and a 2-byte CRC (cyclic redundancy check), for example. The BID is an identifier for uniquely identifying a data block. The BCC area 191 stores a BCC 1 for the data 1, a BCC 2 for the data 2, . . . , and a BCC 8 for the data 8, for example.

As described above, the user data and the BCCs for the same are stored in the cache memory 19 in the storage areas different in the unit of access. This makes it possible to reduce the risk of concurrent failure to write both the user data and the BCCs for the same resulting from storage of the user data and the BCCs for the same in one and the same storage area.

Figure 4:
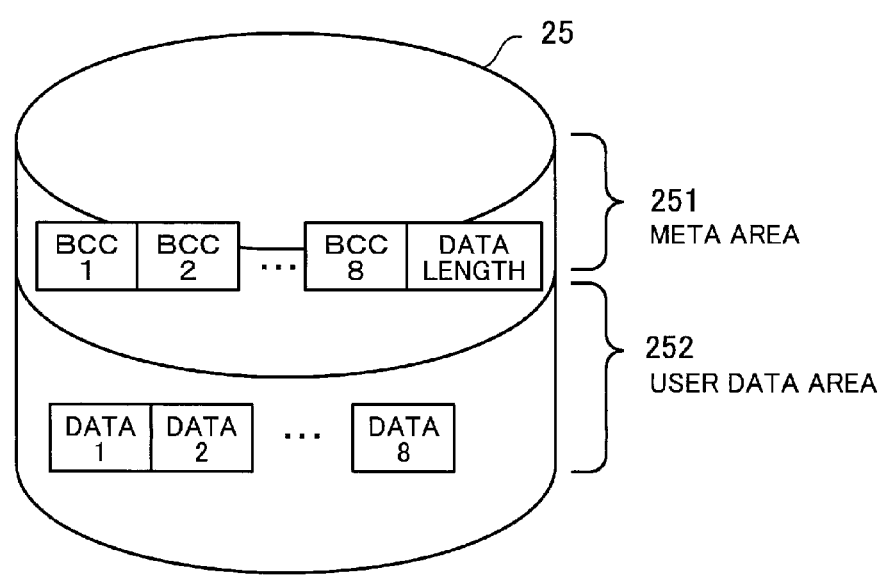
FIG. 4 illustrates an example of a configuration of a disk module in the second embodiment.

Next, a disk module in the second embodiment will be described with reference to FIG. 4. FIG. 4 illustrates an example of a configuration of the disk module in the second embodiment. The HDDs 25 and 26 are one type of disk modules, more specifically, one type of disk drive devices. The HDDs 25 and 26 are the same in the configuration, and descriptions will be given only as to the HDD 25.

The HDD 25 includes a meta area 251 and a user data area 252. The user data area 252 is a storage area for storing user data. The meta area 251 is one of storage areas for storing metadata, which is different from the user data area 252. The metadata includes a BCC for each of data blocks. The metadata also includes area management information. The area management information may include allocation information of i node, V data, and file data, for example.

The user data area 252 stores user data on a data block basis. A data block here is a unit of access to the HDDs 25 and 26, which is a physical address corresponding to an LBA, for example. The user data area 252 stores data 1, data 2, ..., and data 8 on a data block basis, for example.

The meta area 251 stores a BCC for each of data blocks. The meta area 251 stores a BCC 1 for the data 1, a BCC 2 for the data 2, ..., and a BCC 8 for the data 8, for example.

As described above, the user data and the BCCs for the same are stored in the HDD 25 in the storage areas different in the unit of access. This makes it possible to reduce the risk of concurrent failure to write both the user data and the BCCs for the same resulting from storage of the user data and the BCCs for the same in one and the same storage area.

Figure 5:
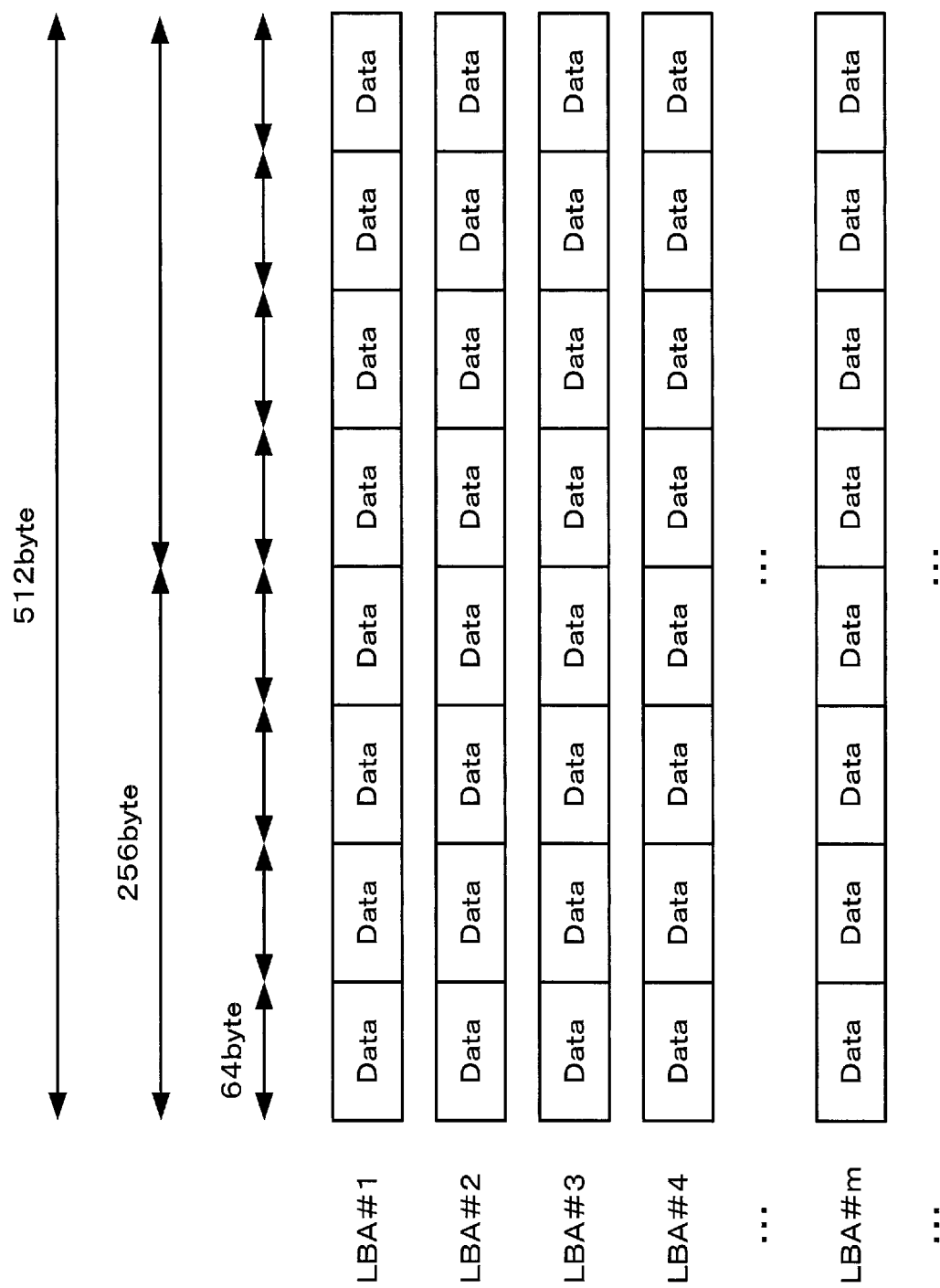
FIG. 5 illustrates an example of data blocks in the second embodiment.

Next, data blocks in the second embodiment will be described with reference to FIG. 5. FIG. 5 illustrates an example of the data blocks in the second embodiment.

Each of the data blocks has a size of 512 bytes, and an 8-byte BCC is generated for 512 bytes each. The data blocks are given uniquely identifiable LBAs. For example, the user data area 252 includes LBA #1, LBA #2, LBA #3, LBA #4, ... at which user data is stored. The meta area 251 includes LBA #m at which BCCs are stored. The HDDs 25 and 26 allow the data blocks to be sub-divided into units smaller than the unit of access (512 bytes), such as 256 bytes and 64 bytes.

Figure 6:
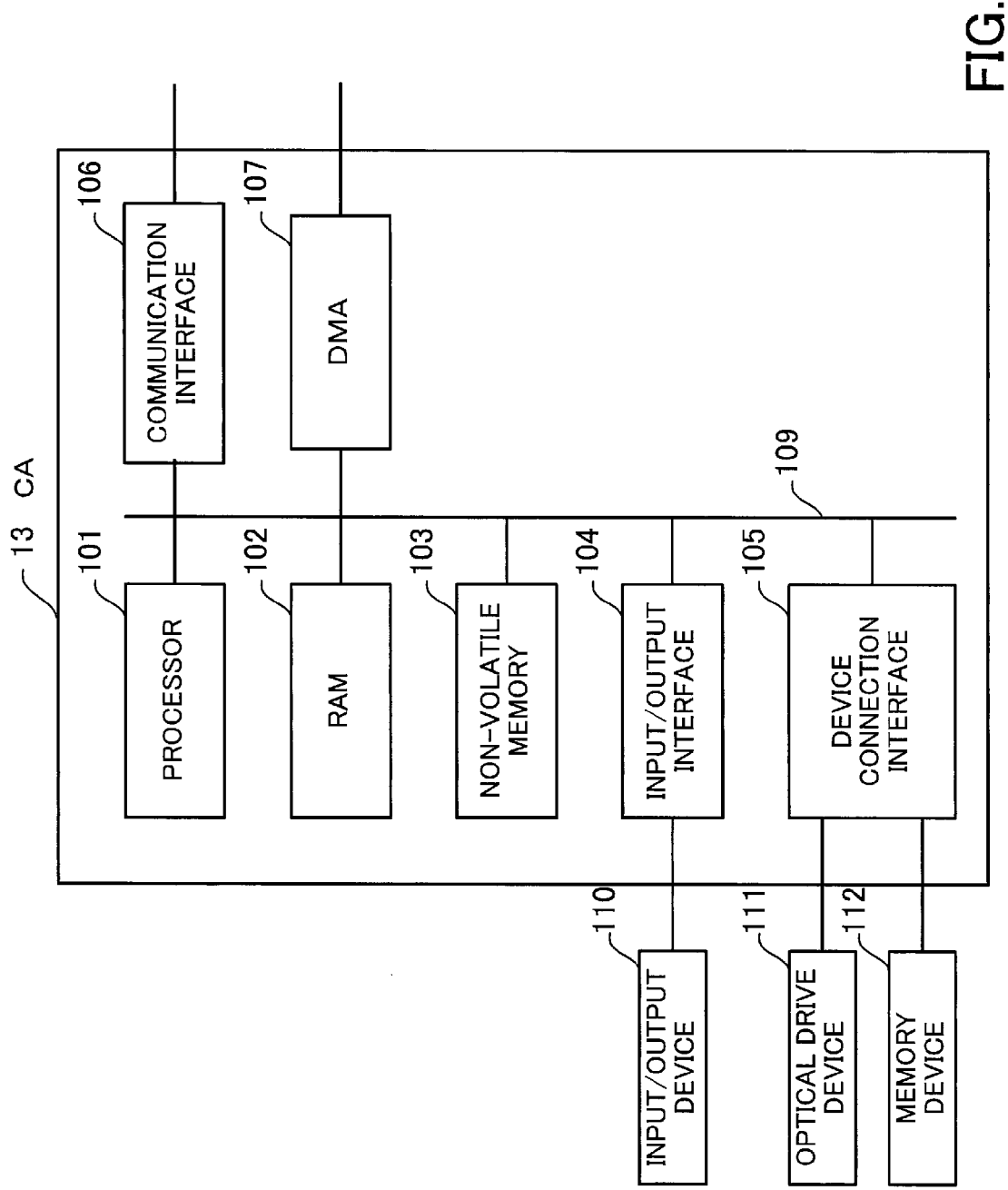
FIG. 6 illustrates an example of a hardware configuration of a CA in the second embodiment.

Next, a hardware configuration of the CA 13 in the second embodiment will be described with reference to FIG. 6. FIG. 6 illustrates an example of the hardware configuration of the CA in the second embodiment. The CAs 13 and 14 are the same in configuration, and descriptions will be given only as to the CA 13.

The CA 13 is entirely controlled by a processor 101. The processor 101 connects to a RAM (random access memory) 102 and a plurality of peripherals via a bus 109. The processor 101 may be a multi-processor. The processor 101 may be a CPU (central processing unit), MPU (micro processing unit), DSP (digital signal processor), ASIC (application specific integrated circuit), or PLD (programmable logic device), for example. Alternatively, the processor 101 may be a combination of two or more of the CPU, MPU, DSP, ASIC, and PLD.

The RAM 102 is used as a main storage device of the CA 13. The RAM 102 temporarily stores at least some of an OS program, firmware, and application programs (control programs and others) to be executed by the processor 101. The RAM 102 also stores various data used by the processor 101 to perform processes. The RAM 102 may further include a cache memory separately from a memory to be used for storage of the various data.

The peripheral devices connected to the bus 109 may include a non-volatile memory 103, an input/output interface 104, a device connection interface 105, a communication interface 106, and a DMA (direct memory access) 107.

The non-volatile memory 103 holds the stored contents even during power-off of the CA 13. The non-volatile memory 103 is an EEPROM (electrically erasable programmable read-only memory) or SSD, for example. The non-volatile memory 103 is used as an auxiliary storage device of the CA 13. The non-volatile memory 103 stores programs and firmware for an operating system, application programs, and various data.

The input/output interface 104 performs input/output processing in connection with an input/output device 110. The device connection interface 105 connects to an optical drive device 111 or a memory device 112. The communication interface 106 connects to the host 11. The DMA 107 exchanges data with the cache memory 19.

The CA 13 realizes the processing capabilities in the second embodiment by executing programs recorded in computer-readable storage media, for example. The programs describing the contents of the processes to be executed by the CA 13 may be recorded in various storage media. For example, the programs to be executed by the CA 13 may be stored in the non-volatile memory 103. The processor 101 loads at least some of the programs from the non-volatile memory 103 into the RAM 102 to execute the programs. Alternatively, the programs to be executed by the CA 13 may be recorded in portable storage media such as an optical disc, a magneto-optical storage medium, and a memory card, although they are not illustrated.

The optical drive device 111 reads data from an optical disc using laser light or the like. The optical disc is a portable storage medium in which data is recorded in such a manner as to be readable by light reflection. The optical disc may be a DVD (digital versatile disc), DVD-RAM, CD-ROM (compact disc read only memory), CD-R (recordable)/RW(rewritable), or the like. The magneto-optical storage medium may be a MO (magneto-optical disc) or the like.

The memory device 112 is a storage medium with the function of communicating with the device connection interface 105. The memory device 112 may be replaced with a memory reader/writer that writes data into a memory card or reads data from the memory card. The memory card is a card-type storage medium.

The programs stored in the portable storage media are installed into the non-volatile memory 103 and then become executable under control of the processor 101, for example. Alternatively, the processor 101 may read the programs directly from the portable storage media and execute the same.

The hardware configuration as described above realizes the processing capabilities of the CA 13 in the second embodiment. In addition, the CA 14, the CMs 17 and 18, and the storage control apparatus 1 in the first embodiment are realized by the same hardware configuration as that of the CA 13 illustrated in FIG. 6.

Figure 7:
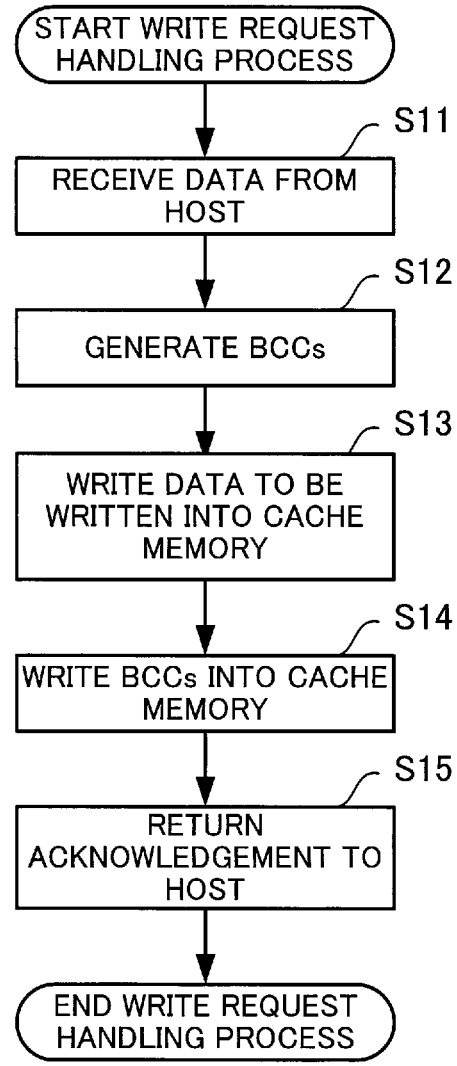
FIG. 7 is a flowchart of a write request handling process in the second embodiment.

Next, a write request handling process in the second embodiment will be described with reference to FIG. 7. FIG. 7 is a flowchart of the write request handling process in the second embodiment. The write request handling process is executed by the CA 13 or 14 upon receipt of a write request from the host 11. In the following description, the CA 13 executes the write request handling process, but the same thing is applicable to the CA 14.

[Step S11] The CA 13 receives data to be written from the host 11.

[Step S12] The CA 13 generates a BCC for each of data blocks in the data to be written.

[Step S13] The CA 13 writes the data to be written into the user data area 192 of the cache memory 19.

[Step S14] The CA 13 writes the generated BCCs into the BCC area 191 of the cache memory 19.

[Step S15] The CA 13 returns an acknowledgement to the host 11 to terminate the write request handling process.

Figure 8:
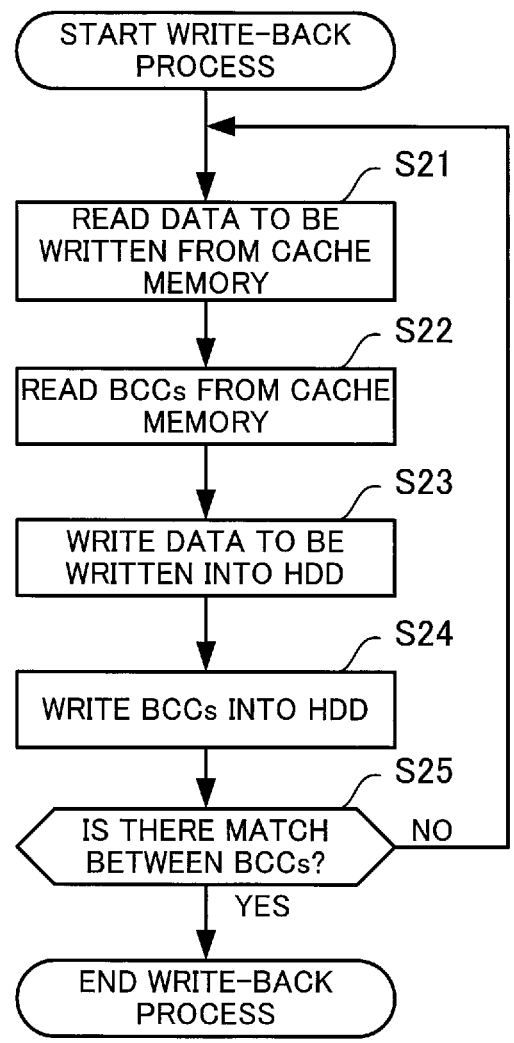
FIG. 8 is a flowchart of a write-back process in the second embodiment.

Next, a write-back process in the second embodiment will be described with reference to FIG. 8. FIG. 8 is a flowchart of the write-back process in the second embodiment. The write-back process is executed by the CM 17 or 18 after termination of the write request handling process by the CA 13 or 14. In the following description, the CM 17 executes the write-back process, but the same thing is applicable to the CM 18.

[Step S21] The CM 17 reads data to be written from the user data area 192 of the cache memory 19.

[Step S22] The CM 17 reads BCCs from the BCC area 191 of the cache memory 19.

[Step S23] The CM 17 writes the data to be written into the user data area 252 of the HDD 25.

[Step S24] The CM 17 writes the BCCs into the meta area 251 of the HDD 25.

[Step S25] The CM 17 reads data to be written on a data block basis from the user data area 252 of the HDD 25 to generate BCCs, and then compares the generated BCCs with the BCCs read from the meta area 251 of the HDD 25. The CM 17 determines whether there is a match between the generated BCCs and the read BCCs. When there is no match between the generated BCCs and the read BCCs, the CM 17 moves to step S21 to perform a retry operation. Meanwhile, when there is a match between the generated BCCs and the read BCCs, the CM 17 terminates the write-back process.

In the storage server 10 described above, even if writing of data into the HDD 25 fails at step S23, the data to be written and the BCCs are stored in different areas and thus the failure of writing of the data to be written (block-write failure) will not be passed unnoticed.

Figure 9:
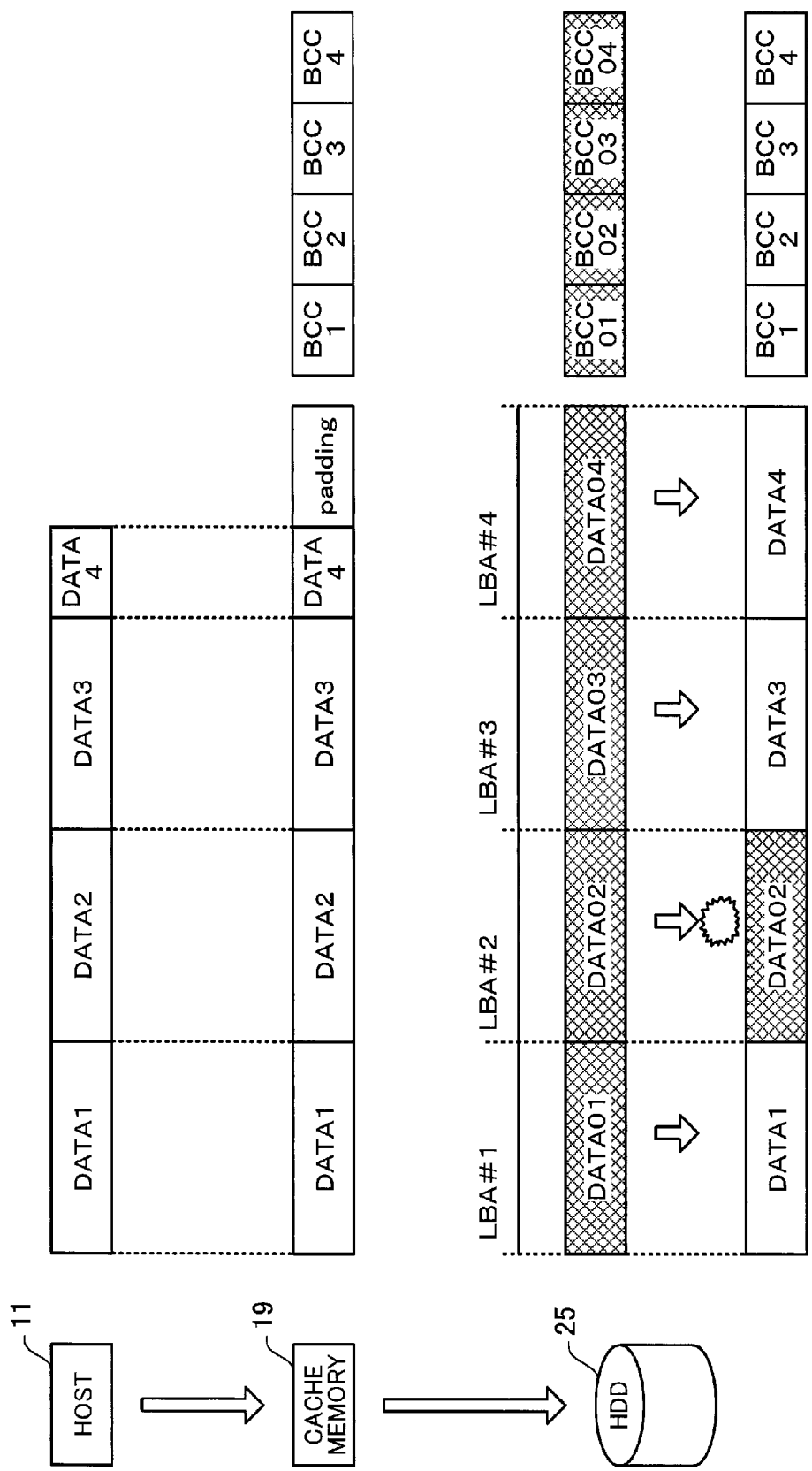
FIG. 9 illustrates an example of a block-write failure in the second embodiment.

The block-write failure in the second embodiment will be described with reference to FIG. 9. FIG. 9 illustrates an example of the block-write failure in the second embodiment.

The storage server 10 (CA 13) receives from the host 11 a write request for DATA 1, DATA 2, DATA 3, and DATA 4 as data to be written.

The storage server 10 (CA 13) re-arranges the DATA 1, DATA 2, DATA 3, and DATA 4 in a data block size. For example, the storage server 10 (CA 13) pads the DATA 4 smaller than the data block size. The storage server 10 (CA 13) generates a BCC 1 from the DATA 1, generates a BCC 2 from the DATA 2, generates a BCC 3 from the DATA 3, and generates a BCC 4 from the padded DATA 4. The storage server 10 (CA 13) writes the DATA 1, DATA 2, DATA 3, and DATA 4 into the user data area 192 of the cache memory 19. The storage server 10 (CA 13) writes the BCC 1, BCC 2, BCC 3, and BCC 4 into the BCC area 191 of the cache memory 19.

The storage server 10 (CM 17) reads the DATA 1, DATA 2, DATA 3, and DATA 4 from the user data area 192 of the cache memory 19. The storage server 10 (CM 17) reads the BCC 1, BCC 2, BCC 3, and BCC 4 from the BCC area 191 of the cache memory 19.

At that time, the HDD 25 stores in the user data area 252 a DATA 01 at an LBA #1, a DATA 02 at an LBA #2, a DATA 03 at an LBA #3, and a DATA 04 at an LBA #4. The HDD 25 stores in the meta area 251 a BCC 01 for the DATA 01, a BCC 02 for the DATA 02, a BCC 03 for the DATA 03, and a BCC 04 for the DATA 04.

The storage server 10 (CM 17) overwrites the original data to update the user data area 252 of the HDD 25. In this example, it is assumed that the storage server 10 (CM 17) fails to write the DATA 2 at the LBA #2 (block-write failure). Accordingly, the DATA 1 is stored at the LBA #1, the DATA 02 is stored at the LBA #2, the DATA 3 is stored at the LBA #3, and the DATA 4 is stored at the LBA #4. That is, the DATA 02 remains at the LBA #2 due to the block-write failure.

The storage server 10 (CM 17) also overwrites the original data to update the meta area 251 of the HDD. Thus, the BCC 1, BCC 2, BCC 3, and BCC 4 are stored in the meta area 251 of the HDD 25. Accordingly, there is no match between the BCC 02 generated from the DATA 02 stored in the LBA #2 and the BCC 2 stored in the meta area 251 of the HDD 25.

Therefore, the storage server 10 (CM 17) detects the block-write failure in the user data area 252 of the HDD 25. Thus, the storage server 10 is improved in the detection accuracy of data write failure.

Figure 10:
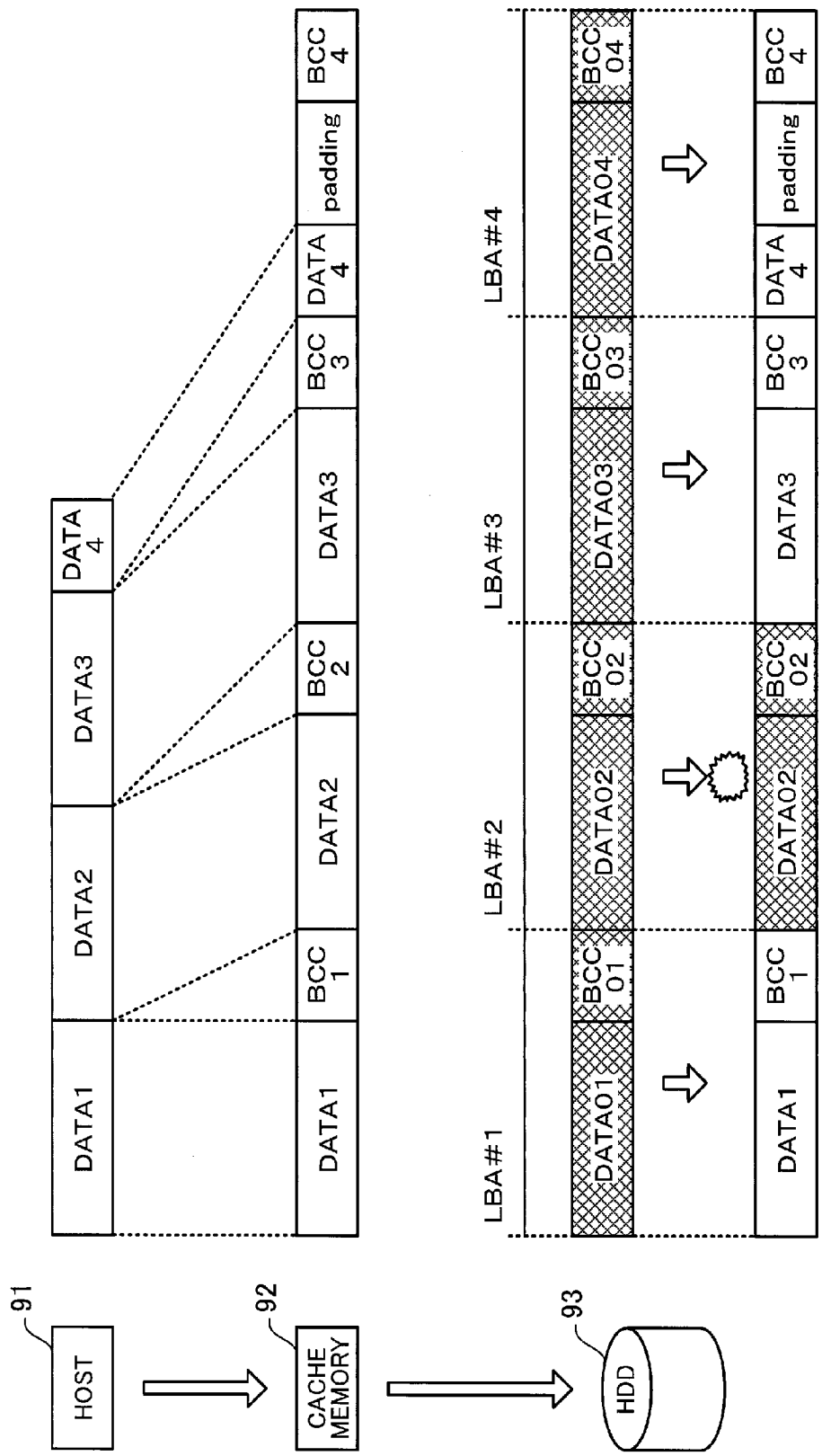
FIG. 10 illustrates a comparative example of a block-write failure (first)

A comparative example of a block-write failure will be described with reference to FIG. 10. FIG. 10 illustrates the comparative example of a block-write failure (first).

A storage server receives from a host a write request for DATA 1, DATA 2, DATA 3, and DATA 4 as data to be written.

The storage server re-arranges the DATA 1, DATA 2, DATA 3, and DATA 4 in a data block size. The storage server generates a BCC 1 from the DATA 1, a BCC 2 from the DATA 2, a BCC 3 from the DATA 3, and a BCC 4 from the padded DATA 4. The storage server writes into a cache memory the DATA 1 with the BCC 1, the DATA 2 with the BCC 2, the DATA 3 with the BCC 3, and the padded DATA 4 with the BCC 4.

The storage server reads from the cache memory the DATA 1 with the BCC 1, the DATA 2 with the BCC 2, the DATA 3 with the BCC 3, and the padded DATA 4 with the BCC 4.

At that time, the HDD stores a DATA 01 with a BCC 01 at an LBA #1, a DATA 02 with a BCC 02 at an LBA #2, a DATA 03 with a BCC 03 at an LBA #3, and a padded DATA 04 with a BCC 04 at an LBA #4.

The storage server overwrites the original data to update the HDD. In this example, it is assumed that the storage server fails to write the DATA 2 with the BCC 2 at the LBA #2 (block-write failure). Accordingly, the DATA 1 with the BCC 1 is stored at the LBA #1, the DATA 02 with the BCC 02 is stored at the LBA #2, the DATA 3 with the BCC 3 is stored at the LBA #3, and the padded DATA 4 with the BCC 4 is stored at the LBA #4. That is, the DATA 02 with the BCC 02 remains at the LBA #2 due to the block-write failure.

There is a match between the BCC 02 generated from the DATA 02 stored at the LBA #2 and the BCC 02 stored at the LBA #2.

That is, the storage server does not detect the block-write failure in the HDD. Such the storage server is lacking in the detection accuracy of data write failure. In contrast, the storage server 10 in the second embodiment detects the block-write failure in the user data area 252 of the HDD 25 as described above with reference to FIG. 9, and thus is higher in the detection accuracy of data write failure than the comparative example.

Figure 11:
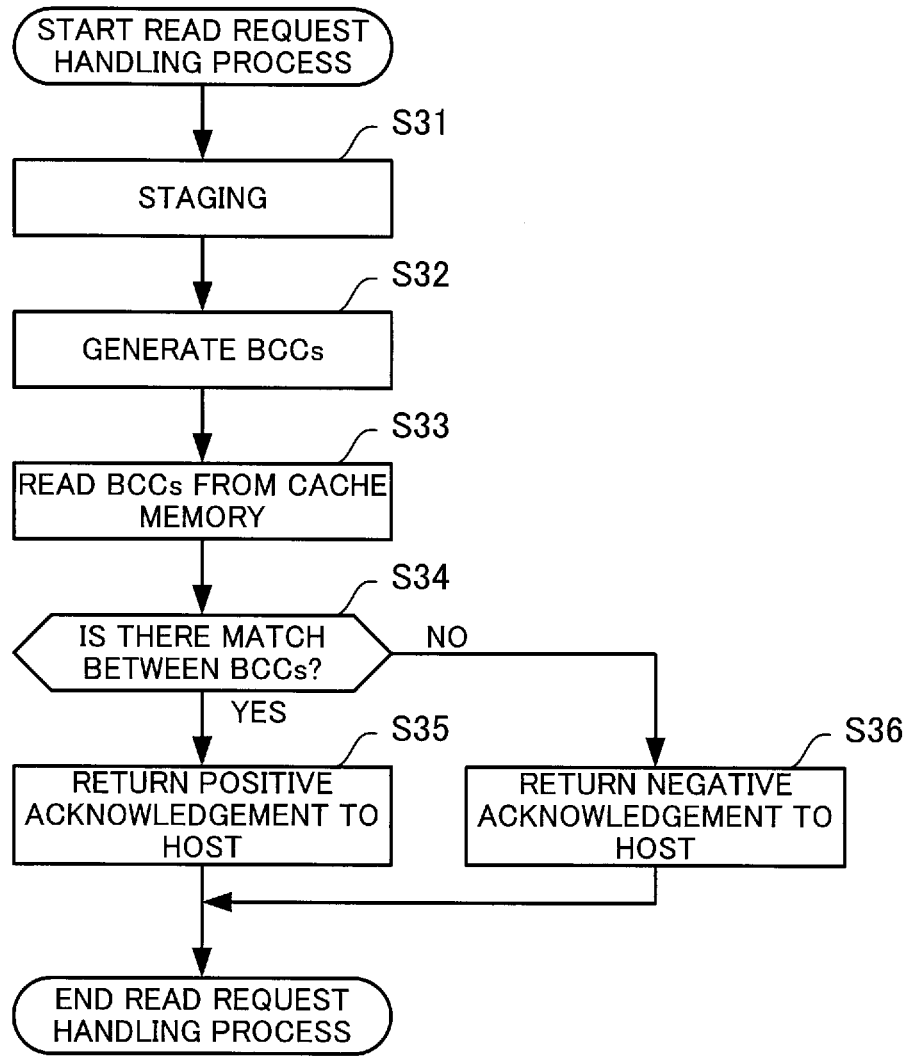
FIG. 11 is a flowchart of a read request handling process in the second embodiment.

Next, a read request handling process in the second embodiment will be described with reference to FIG. 11. FIG. 11 is a flowchart of the read request handling process in the second embodiment. The read request handling process is executed when the CA 13 or 14 receives a read request from the host 11. In the following description, the CA 13 executes the read request handling process, but the same thing is applicable to the CA 14.

[Step S31] The CM 17 reads data to be read from the user data area 252 of the HDD 25, and writes the same into the user data area 192 of the cache memory 19 (staging). The CM 17 also reads the BCCs for the data to be read from the meta area 251 of the HDD 25, and writes the same into the BCC area 191 of the cache memory 19.

[Step S32] The CA 13 reads the data to be read from the user data area 192 of the cache memory 19, and generates a BCC for each of the data blocks.

[Step S33] The CA 13 reads the BCCs from the BCC area 191 of the cache memory 19.

[Step S34] The CA 13 determines whether there is a match between the BCCs generated at step S32 and the BCCs read at step S33. When there is a match between the generated BCCs and the read BCCs, the CA 13 moves to step S35. When there is no match, the CA 13 moves to step S36.

[Step S35] The CA 13 returns a positive response to the host to terminate the read request handling process.

[Step S36] The CA 13 returns an error response to the host to terminate the read request handling process.

As described above, the storage server 10 detects the block-write failure in the user data area 252 of the HDD 25. Therefore, the storage server 10 is improved in the detection accuracy of data write failure.

Figure 12:
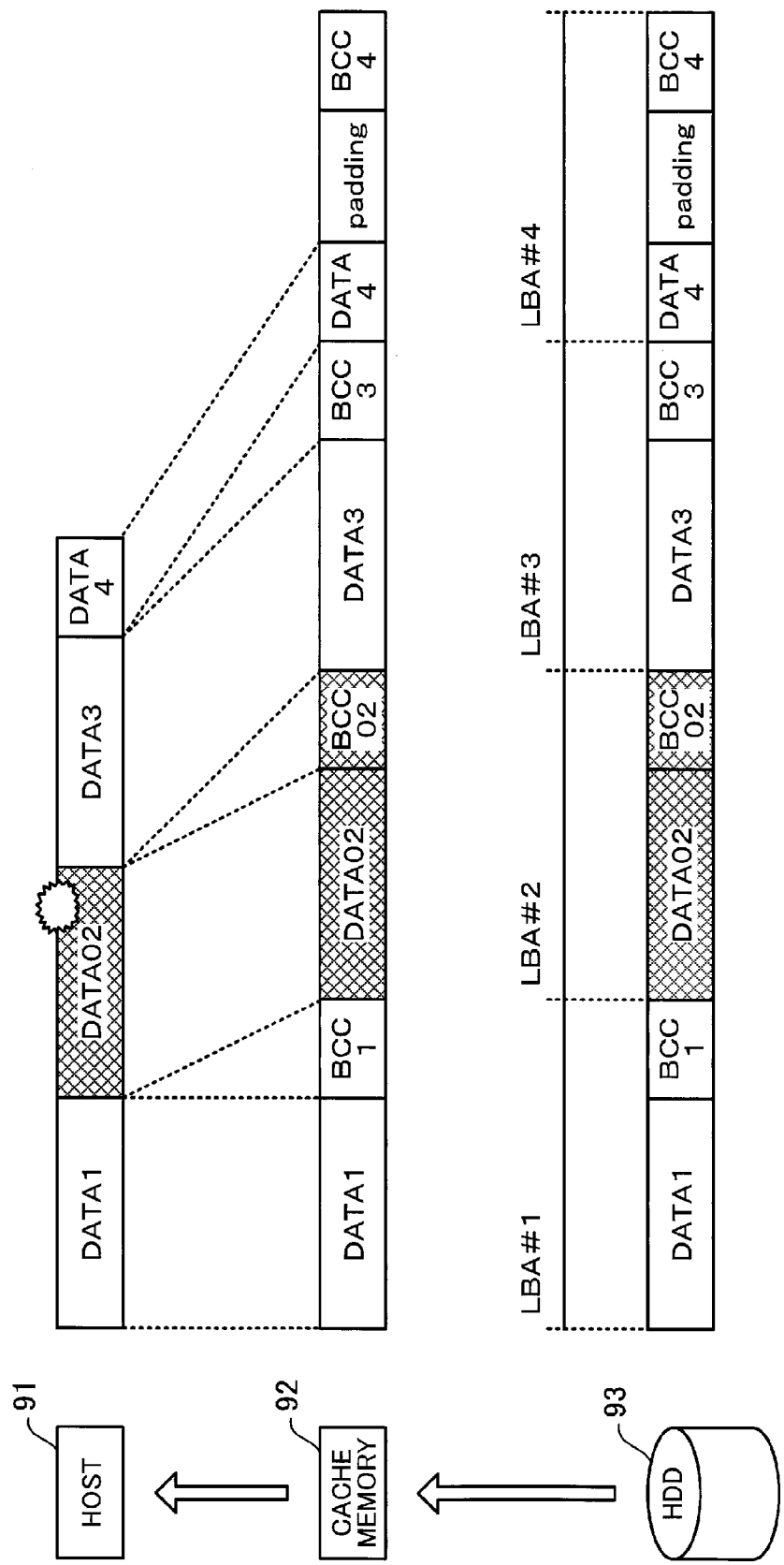
FIG. 12 illustrates a comparative example of a block-write failure (second)

Another comparative example of a block-write failure will be described with reference to FIG. 12. FIG. 12 illustrates the comparative example of a block-write failure (second).

The storage server 10 receives a read request for a DATA 1, DATA 2, DATA 3, and DATA 4 as data to be read. At that time, due to a block-write failure in the LBA #2, the HDD stores the DATA 1 with a BCC 1 at the LBA #1, the DATA 02 with a BCC 02 at the LBA #2, the DATA 3 with a BCC 3 at the LBA #3, and the DATA 4 with a BCC 4 at the LBA #4.

The storage server reads the DATA 1 with the BCC1, the DATA 02 with the BCC 02, the DATA 3 with the BCC 3, and the padded DATA 4 with the BCC 4 from the HDD into the cache memory.

In a storage server, there is a match between the BCC 02 generated from the DATA 02 stored in the cache memory and the BCC 02 stored in the cache memory. That is, the storage server does not detect the block-write failure in the HDD.

Thus, the storage server returns to the host the DATA 1, DATA 02, DATA 3, and DATA 4 read from the cache memory. The host detects data corruption because the DATA 2 is replaced with the DATA 02.

In contrast, the storage server 10 in the second embodiment detects the block-write failure in the user data area 252 of the HDD 25 even at the time of making a response to the read request as described above with reference to FIG. 11. The storage server 10 is thus higher in the detection accuracy of data write failure than the comparative example. The storage server 10 also reduces a processing load on the host in handling the data corruption.

Third Embodiment

Figure 13:
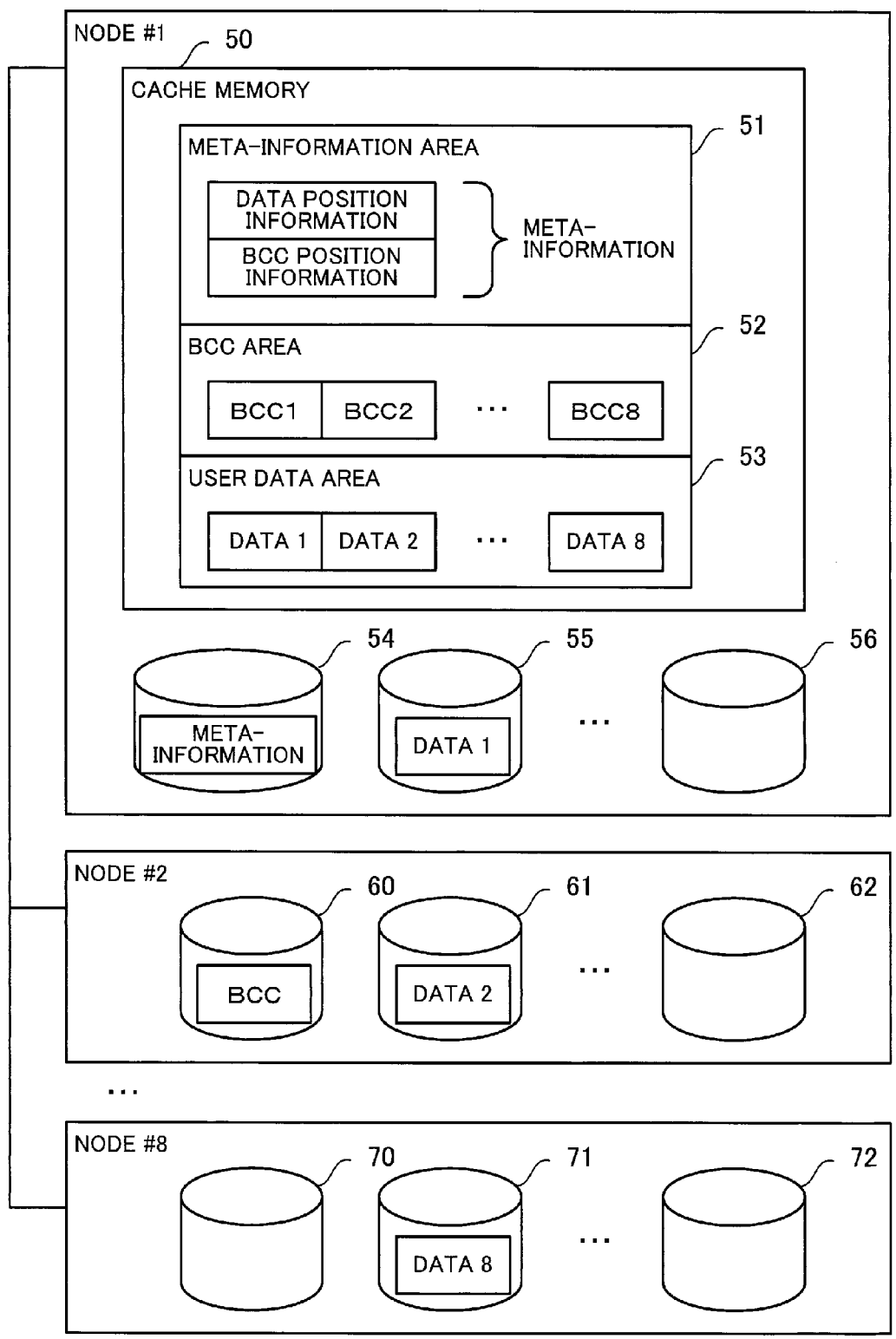
FIG. 13 illustrates an example of a configuration of a storage control apparatus in a third embodiment.

Next, a storage control apparatus in a third embodiment will be described with reference to FIG. 13. FIG. 13 illustrates an example of a configuration of the storage control apparatus in the third embodiment.

Node #1, node #2, . . . , and node #8 each works as a storage control apparatus, and the plurality of nodes realizes a scale-out storage with improvement in overall performance. Each of the nodes has the same hardware configuration as that of the storage server 10 in the second embodiment.

Each of the nodes includes a cache memory and one or more HDDs. The node #1 includes a cache memory 50 and HDDs 54, 55, and 56. The node #2 includes a cache memory not illustrated and HDDs 60, 61, and 62. The node #8 includes a cache memory not illustrated and HDDs 70, 71, and 72. The nodes have CAs not illustrated that serve as host interface control units through which the nodes are connected to hosts. The nodes have CMs not illustrated that serve as connection control units through which the nodes are connected to one another.

The node #1 is different from the storage server 10 in the second embodiment in including a meta-information area 51, a BCC area 52, and a user data area 53 in the cache memory 50.

The meta-information area 51 is an area for storing in a meta area meta-information to be stored in the HDD. The user data area 53 is an area for storing user data on a data block basis. The BCC area 52 is an area for storing BCCs for data blocks in the user data stored in the user data area 53.

The node #1 stores the meta-information in the meta area of the HDD 54, and the nodes #1 to #8 decentrally store the data and the BCCs in the HDDs. The meta-information includes data position information (data-to-be-written storage destination information) and BCC position information (error detection information storage destination information). The data position information indicates where data is stored, and for example, indicates that the data 1 is stored at a predetermined address on the HDD 55 of the node #1. The BCC position information indicates where BCCs is stored, and for example, indicates the BCCs corresponding to the data 1 to 8 are stored at predetermined addresses on the HDD 60 of the node #2.

Figure 14:
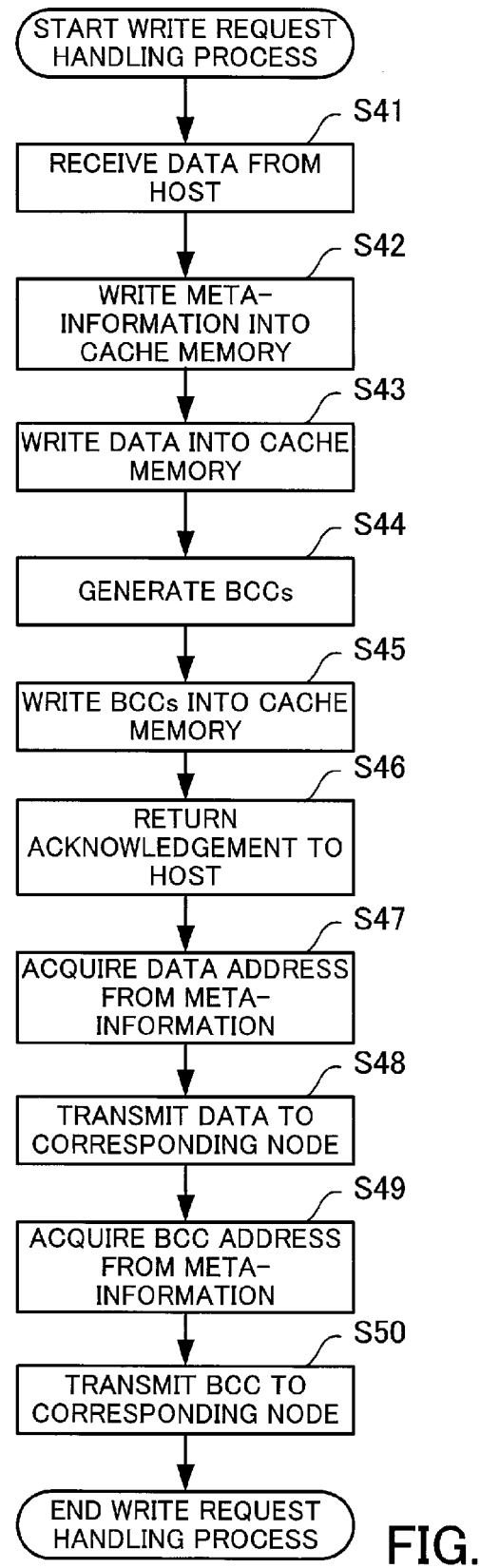
FIG. 14 is a flowchart of a write request handling process in the third embodiment.

Next, a write request handling process in a third embodiment will be described with reference to FIG. 14. FIG. 14 is a flowchart of the write request handling process in the third embodiment. The write request handling process is executed by a node upon receipt of a write request from a host. In the following description, the node #1 illustrated in FIG. 13 executes the write request handling process, but the same thing is applicable to the nodes #2 to #7.

[Step S41] The node #1 receives data to be written from the host.

[Step S42] The node #1 reads meta-information from the HDD 54 and writes the same into the meta-information area 51 of the cache memory 50. Accordingly, the node #1 stores the data position information and the BCC position information in the meta-information area 51.

[Step S43] The node #1 writes the data to be written received from the host into the user data area 53 of the cache memory 50. Accordingly, the node #1 stores the data to be written (data 1, data 2, . . . , and data 8) in the user data area 53.

[Step S44] The node #1 generates a BCC for each of the data blocks from the data to be written (data 1, data 2, . . . , and data 8).

[Step S45] The node #1 writes the generated BCCs into the BCC area 52 of the cache memory 50.

[Step S46] The node #1 returns an acknowledgement to the host.

[Step S47] The node #1 acquires data addresses (data position information) in the meta-information.

[Step S48] The node #1 transmits the data to the responsible nodes indicated by the data addresses. For example, the node #1 transmits the data 2 to the node #2, and transmits the data 8 to the node #8. Upon receipt of the data, each of the responsible nodes writes the data into the HDD indicated by the data address at a predetermined address. The node #1 is a node corresponding to the data 1 and thus the node #1 writes the data 1 into the HDD 55.

[Step S49] The node #1 acquires a BCC address (BCC position information) in the meta-information.

[Step S50] The node #1 transmits a BCC to the responsible node indicated by the BCC address. For example, the node #1 transmits the BCC to the node #2. Upon receipt of the BCC, the responsible node writes the data into the HDD indicated by the BCC address at a predetermined address. After the transmission of the BCC to the responsible node, the node #1 terminates the write request handling process.

As described above, even upon receipt of a write request from the host, the node does not rewrite the meta area of the HDD. Therefore, the node does not need to write the meta-information read from the HDD to the cache memory back into the meta area. Accordingly, the node makes a decreased number of accesses to the disk to write meta-information back into the meta area. The node thus makes it possible to improve the detection accuracy of data write failure and enhance disk access performance.

To distribute a program, portable storage media storing the program such as DVDs or CD-ROMs are sold, for example. Alternatively, the program may be stored in advance in a storage device of a server computer such that the program is transferred from the server computer to other computers via a network.

To execute the program at a computer, the program recorded in a portable storage medium or transferred from the server computer is stored in a storage device of the computer. Then, the computer reads the program from its storage device and executes the process according to the program. Alternatively, the computer may read the program directly from the portable storage medium and execute the process according to the program. Still alternatively, whenever the program is transferred to the computer from the server computer connected via a network, the computer may execute the process according to the received program.

At least some of the foregoing processing capabilities may be realized by electronic circuits such as a DSP, ASIC, and PLD.

In one aspect of the embodiments, the storage control apparatus, the control program, and the control method enhance the detection accuracy of data write failure.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus comprising:
a cache memory: and
a processor,
wherein the cache memory includes an error detection information storage area and a data storage area different from the error detection information storage area, and wherein the processor performs a procedure including
generating error detection information for each data block as a unit of access to data to be written in a disk drive device and storing the error detection information in the error detection information storage area,
storing the data in the data storage area on a data block basis,
storing the error detection information read from the error detection information storage area in a meta-information storage area of the disk drive device, the meta-information storage area being for storing meta information,
storing the data read from the data storage area in a user data storage area of the disk drive device, the user data storage area being different from the meta-information storage area and being for storing user data, and
performing error detection on said each data block according to the error detection information read from the meta-information storage area and the data read from the user data storage area.

2. A non-transitory computer-readable storage medium storing a control program that causes a computer to perform a procedure for controlling a disk drive device, the procedure comprising:
generating error detection information for each data block as a unit of access to data to be written in the disk drive device and storing the error detection information in an error detection information storage area of a cache memory;
storing the data in a data storage area of the cache memory on a data block basis, the data storage area being different from the error detection information storage area; and
storing the error detection information read from the error detection information storage area in a meta-information storage area of the disk drive device, the meta-information storage area being for storing meta-information,
storing the data read from the data storage area in a user data storage area of the disk drive device, the user data storage area being different from the meta-information storage area and being for storing user data, and
performing error detection on said each data block according to the error detection information read from the meta-information storage area and the data read from the user data storage area.

3. A control method of controlling a disk drive device comprising:
Generating, by a computer, error detection information for each data block as a unit of access to data to be written in the disk drive device and storing, by the computer, the error detection information in an error detection information storage area of a cache memory;
Storing, by the computer, the data in a data storage area of the cache memory on a data block basis, the data storage area being different from the error detection information storage area of the storage device; and
Storing, by the computer, the error detection information read from the error detection information storage area in a meta-information storage area of the disk drive device, the meta-information storage area being for storing meta-information,
Storing, by the computer, the data read from the data storage area in a user data storage area of the disk drive device, the user data storage area being different from the meta-information storage area and being for storing user data, and performing, by the computer, error detection on said each data block according to the error detection information read from the meta-information storage area and the data read from the storage area.

\* \* \* \* \*